United States Patent
De Bart et al.

(10) Patent No.: US 7,830,970 B2
(45) Date of Patent: Nov. 9, 2010

(54) RECEIVER FOR A MULTI-CARRIER COMMUNICATION SYSTEM

(75) Inventors: Abraham Jan De Bart, Beijing (CN); Edwin Robert Dilling, Nijmegen (NL)

(73) Assignee: NXP B.V., Eindhoven (NL)

( * ) Notice: Subject to any disclaimer, the term of this patent is extended or adjusted under 35 U.S.C. 154(b) by 1192 days.

(21) Appl. No.: 10/559,361

(22) PCT Filed: Jun. 1, 2004

(86) PCT No.: PCT/IB2004/050810

§ 371 (c)(1),
(2), (4) Date: Dec. 6, 2005

(87) PCT Pub. No.: WO2004/110012

PCT Pub. Date: Dec. 16, 2004

(65) Prior Publication Data

US 2006/0198449 A1  Sep. 7, 2006

(30) Foreign Application Priority Data

Jun. 11, 2003 (EP) .................. 03101696

(51) Int. Cl.
*H04L 27/28* (2006.01)

(52) U.S. Cl. ................................... 375/260

(58) Field of Classification Search ............ 375/259, 375/260, 316, 346

See application file for complete search history.

(56) References Cited

U.S. PATENT DOCUMENTS

| | | | |
|---|---|---|---|
| 6,317,473 B1 | 11/2001 | Stott et al. | |
| 6,370,188 B1 | 4/2002 | Wu et al. | |
| 6,618,352 B1 * | 9/2003 | Shirakata et al. | ............ 370/203 |
| 7,027,464 B1 | 4/2006 | Nakahara et al. | |
| 7,283,498 B2 * | 10/2007 | Ro et al. | ...................... 370/333 |
| 2002/0004920 A1 * | 1/2002 | Cho et al. | ................... 714/704 |
| 2002/0159533 A1 | 10/2002 | Crawford | |
| 2003/0012308 A1 * | 1/2003 | Sampath et al. | ............. 375/340 |

(Continued)

FOREIGN PATENT DOCUMENTS

EP  0 683 898 A2  3/1999

(Continued)

OTHER PUBLICATIONS

International Preliminary Report on Patentability for Int'l. Patent Appln. No. PCT/IB2004/050810 (Dec. 13, 2005).

*Primary Examiner*—Kevin M Burd (57) ABSTRACT

A receiver for a multi-carrier communication system receives training pilot carriers (TRPC) during a training symbol (T1, T2) which precedes data symbols (DS) which have data carriers (DC) and data pilot carriers (PC). The receiver has a correction unit (171) which supplies, under control of a control signal (CEC), a corrected signal (CDC1) which has the data carriers (DC) which are corrected for a common amplitude error and/or common phase error. A quality determination unit (174) determines which ones of the training pilot carriers (TRPC) which occur at positions of the data pilot carriers (PC) fulfill a predetermined quality criterion A control unit (175) supplies the control signal (CEC) which is dependent on an amplitude and/or phase of the data pilot carriers (PC) of which corresponding training pilot carriers (TRPC) fulfill the predetermined quality criterion, and not on the data pilot carriers (PC) of which corresponding training pilot carriers (TRPC) do not fulfill the predetermined quality criterion.

17 Claims, 4 Drawing Sheets

U.S. PATENT DOCUMENTS

2003/0096579 A1 * 5/2003 Ito et al. .................... 455/67.1

FOREIGN PATENT DOCUMENTS

| | | |
|---|---|---|
| EP | 0 903 898 A2 | 3/1999 |
| EP | 1 209 836 A1 | 5/2002 |
| EP | 1 349 337 A | 10/2003 |
| JP | 11-112460 A | 4/1999 |
| JP | 2000-165344 A | 6/2000 |
| JP | 2000-286819 A | 10/2000 |
| JP | 2001-69118 A | 3/2001 |
| JP | 2001-339363 A | 12/2001 |
| JP | 2002-204215 A | 7/2002 |
| JP | 2002-217860 A | 8/2002 |
| JP | 2002-314506 A | 10/2002 |
| WO | 03/028270 A1 | 4/2003 |

* cited by examiner

RECEIVER FOR A MULTI-CARRIER COMMUNICATION SYSTEM

The invention relates to a receiver for a communication system based on a multi-carrier technique for transmitting information. Such a multi-carrier technique is for example OFDM (Orthogonal Frequency Division Multiplexing) which, for example, is applied in DAB (Digital Audio Broadcasting), DVB (Digital Video Broadcasting) and in indoor communication concepts like HiperLAN/2 and IEEE802.11a. Multi-carrier solutions are also introduced in ADSL (Asymmetric Digital Subscriber Line) and HDSL (High-Speed Digital Subscriber Line) where it is referred to as DMT (Discrete Multi Tone).

The invention further relates to a method of receiving a multi-carrier modulated signal, a multi-carrier communication system comprising such a receiver, and a wireless multi-carrier communication system comprising such a receiver.

EP-A-0903898 discloses an equalizer for an orthogonal frequency division multiplexing (OFDM) receiver. The data symbols comprise pilot carriers which have been transmitted with a well defined predetermined phase and amplitude. The pilot carriers of the data symbols are extracted in the receiver. The phase and amplitude of these pilot carriers is compared to the expected phase and amplitude of the pilot carriers. The difference between the expected and the received phase and amplitude of the pilot carriers is determined by the channel characteristics at the position of the pilot carriers. An interpolator interpolates the channel characteristics of data carriers in-between the pilot carriers. An equalizer in the frequency domain is controlled to multiply the received signal with the inverse of the channel characteristics to correct for the differences detected.

However, if the channel strongly fades, the interpolated channel characteristics for the data symbols may not be sufficiently representative for the real channel.

It is an object of the invention to provide a multi-carrier communication receiver which can better cope with strongly fading channels.

This object is reached by the receiver for a multi-carrier communication system, the receiver being arranged for receiving training pilot carriers during a training symbol preceding data symbols comprising data carriers and data pilot carriers, the receiver comprising a correction unit for supplying, under control of a control signal, a corrected signal comprising information on the data carriers being corrected for a common amplitude error and/or common phase error, a quality determination unit for determining which ones of the training pilot carriers occurring at positions of the data pilot carriers fulfill a predetermined quality criterion, and a control unit for supplying the control signal being dependent on an amplitude and/or phase of the data pilot carriers of which corresponding training pilot carriers fulfill the predetermined quality criterion, and not on the data pilot carriers of which corresponding training pilot carriers do not fulfill the predetermined quality criterion.

This object is also reached by a method of receiving a multi-carrier carrier modulated signal in a multi-carrier communication system, the method comprising receiving training pilot carriers during a training symbol preceding data symbols comprising data carriers and data pilot carriers, supplying, under control of a control signal, a corrected signal comprising information on the data carriers being corrected for a common amplitude error and/or common phase error, determining which ones of the training pilot carriers occurring at positions of the data pilot carriers fulfill a predetermined quality criterion, and supplying the control signal being dependent on an amplitude and/or phase of the data pilot carriers of which corresponding training pilot carriers fulfill the predetermined quality criterion, and not on the data pilot carriers of which corresponding training pilot carriers do not fulfill the predetermined quality criterion.

The object of the invention is further reached by a multi-carrier communication system comprising such a receiver, and by a wireless multi-carrier communication system comprising such a receiver, wherein said system comprises a transmitter for transmitting a modulated multi-carrier high frequent signal via air, and the receive comprises means for receiving said high frequent signal.

In a channel with frequency selective fading, different carriers with different frequencies suffer from different attenuations and different phase shifts. The receiver needs to make an estimate of these distortions per carrier, and to correct them before the phase and amplitude of the carriers can be demapped to bits. Usually, the channel estimator uses training symbols to make an estimate of the phase and amplitude distortion of each of the data carriers. The channel estimator supplies a correction control signal to a channel corrector. The channel corrector is inserted in the signal path to correct the amplitude and/or phase of the input signal of the channel corrector to obtain a corrected signal.

The channel estimate will not be fully accurate, for example, due to additive noise or due to changing channel characteristics. For short frames, the channel characteristics can be assumed static. However, for long frames, the channel characteristics may change in time.

In accordance with an aspect of the invention, the received signal comprises a training symbol preceding a burst of data symbols. The training symbol comprises pilot carriers which are further referred to as training pilot carriers. Usually two training symbols are present. The data symbols comprise data carriers and pilot carriers which are further referred to as data pilot carriers.

A quality determination unit determines the quality of the training pilot carriers at carrier positions corresponding to the carrier positions of the data pilot carriers by checking whether the training pilot carriers fulfill a predetermined quality criterion.

A control unit uses only the amplitude and/or phase of data pilot carriers of which the corresponding training pilot carrier fulfills the quality criterion, and not the amplitude and/or phase of data pilot carriers for which the corresponding training pilot do not fulfill the quality criterion to determine a control signal.

A correction unit is controlled by the control signal to supply a corrected signal which comprises information on data carriers of a data symbol which is corrected for a common amplitude error and/or a common phase error. Usually, the information on a particular data carrier is the amplitude and/or phase of the data modulated on this data carrier.

For example, in a frequency selective fading channel, the fading may occur at or near to the frequency of one of the training pilot carriers. The amplitude of the training pilot carrier and thus the corresponding data pilot carriers, which are transmitted at the same frequency, will be very low. Thus these data pilot carriers are not very representative for the common amplitude error and the common phase error in the channel at the data carriers in-between the data pilot carriers. Thus, a better estimation of these common errors is obtained if the amplitude and the phase of this particular data pilot carrier is not used.

In particular if streaming video data is transmitted, it is very important that the estimate of the common errors is as good as possible. If the quality of the data recovery is not optimal, the streaming-data will be interrupted causing annoying artifacts. This is less stringent for data transmission systems in which the data frame may be re-transmitted.

In an embodiment in accordance with the invention, in the receiver for the multi-carrier communication system the control unit is arranged for averaging the amplitude and/or phase of the data pilot carriers corresponding to the training pilot carriers fulfilling the predetermined quality criterion to provide an estimate for a common amplitude error and/or a common phase error. With data pilot carriers corresponding to the training pilot carriers fulfilling the predetermined quality criterion is meant those data pilot carriers which occur at the carrier frequencies equal to the carrier frequencies of the training pilot carriers which fulfill the quality criterion. For the sake of simplicity, these data pilot carriers are referred to as the usable data pilot carriers, while the data pilot carriers which correspond to training pilot carriers which do not fulfill the quality criterion are referred to as unusable data pilot carriers.

A simple averaging can be used to determine the estimate. It would be possible to use more complex processing to use the amplitude and/or phase information of the useable data pilot carriers. For example, the data carriers in the neighborhood of the data pilot carriers may be corrected for the common amplitude and/or phase error based on both the usually performed estimation on the training symbols and on the data pilot carriers.

In an embodiment in accordance with the invention, the control unit is arranged for performing said averaging for each data symbol. Now, for each data symbol, the useable data pilot carriers are used to correct for the common amplitude and/or phase error during this data symbol. Thus even when the channel characteristics show a strong fading at the frequency of one (or more) of the data pilot carriers, the correction will be optimal for each data symbol as only the data pilot carriers are used which do not occur at the fading frequency. Alternatively, it would be possible to combine a predetermined number of, preferably successive, data symbols and to use the useable data pilot carriers of these combined data symbols to correct for the common amplitude and/or phase error. This decreases the computational effort required. If several training symbols are present, the quality determination on the relevant training pilot carriers may be performed on the average of two training pilot carriers occurring at the same frequency.

In an embodiment in accordance with the invention, the receiver further comprises a Fast Fourier Transform circuit for supplying the data symbol, the corrected signal representing a phase and amplitude of the data carriers.

In an embodiment in accordance with the invention, the quality determination unit is arranged for comparing an amplitude of the training pilot carriers with a reference amplitude, a particular one of the training pilot carriers fulfilling the predetermined quality criterion only if its amplitude is higher than the reference amplitude. In a frequency selective fading channel, the fading may occur at or near to the frequency of one of the training pilot carriers. The amplitude of the training pilot carrier and thus of the corresponding data pilot carrier will be very low and is not very representative for the common amplitude error and the common phase error in the channel at the data carriers in the data symbol the data pilot carrier occurs. Thus, a better estimation of these common errors is obtained if the amplitude and the phase of this particular data pilot carrier is not used.

In an embodiment in accordance with the invention, the quality determination unit is arranged for comparing a phase of the training pilot carriers with an average value of phase of the training pilot carriers, a particular one of the training pilot carriers fulfilling the predetermined quality criterion only if its phase difference with respect to the average value is smaller than a predetermined value. Now, it is expected that the phase differences between the training pilot carriers will be not very large. If, for example, for a particular training symbol, one of the training pilot carriers has a phase which differs more than a predetermined value from the phases of the other training pilot carriers, the corresponding data pilot carriers occurring during different data symbols may be excluded from use for the estimation of the common errors. However, although for many receiving conditions this may provide a good estimation, in some receiving conditions, even training pilot carriers with a large phase difference with respect to the other training pilot carriers should be used to determine the estimation. Therefore, it is preferred to exclude the data pilot carriers of which the corresponding training pilot carrier has a too low amplitude.

In an embodiment in accordance with the invention, the multi-carrier communication system is based on orthogonal frequency division multiplexing OFDM. OFDM as such is a well known modulation technique.

These and other aspects of the invention are apparent from and will be elucidated with reference to the embodiments described hereinafter.

Figure 1:
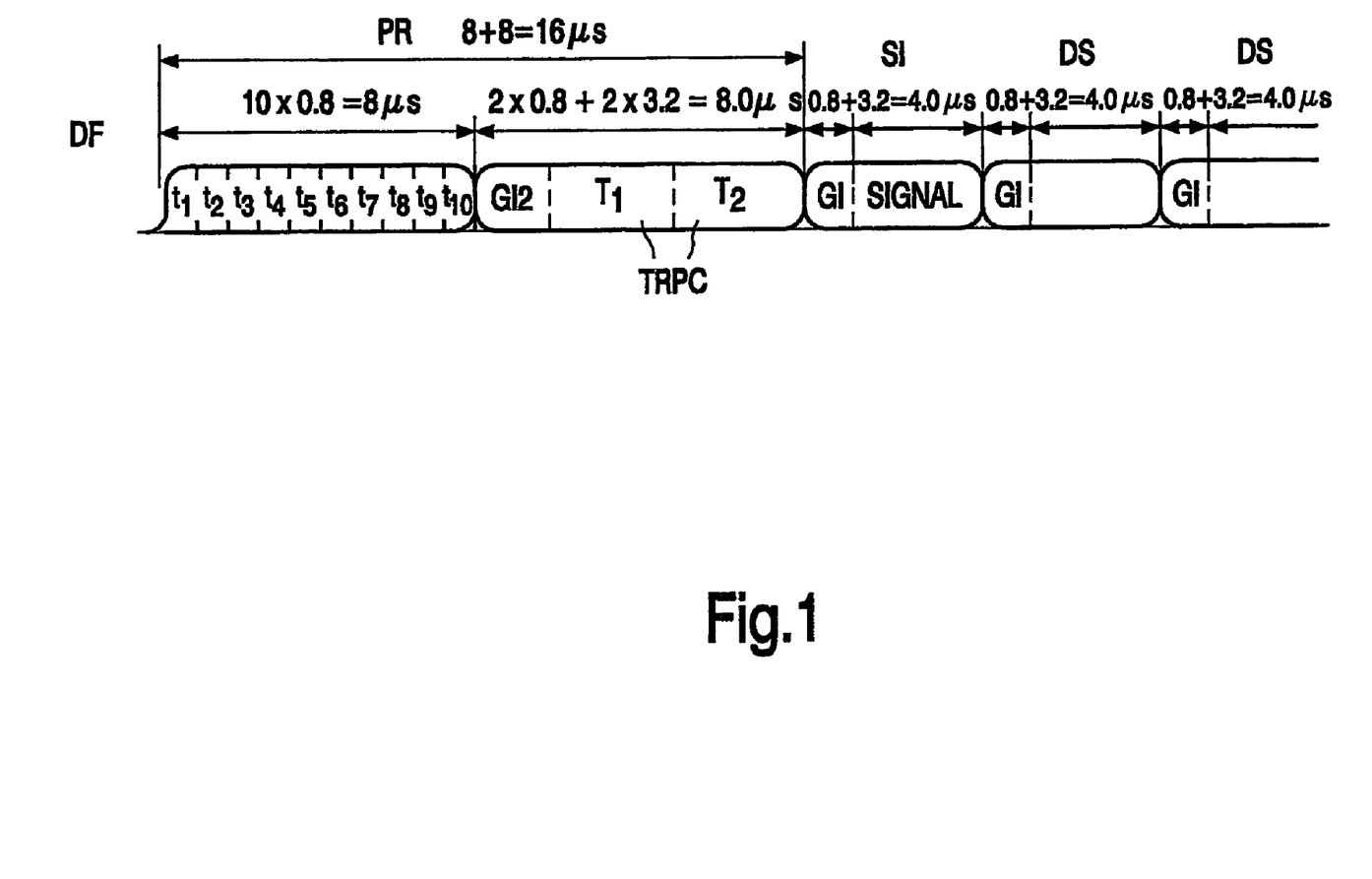
FIG. 1 shows a data frame as prescribed in the IEEE802.11a standard.

In the drawings:

FIG. 1 shows a data frame as prescribed in the IEEE802.11a standard. The data frame DF comprises a preamble PR and data symbols DS.

The preamble PR comprises 10 short symbols t1 to t10, which together have a duration of two data symbols DS. The preamble PR further comprises two training symbols T1 and T2 with each a duration equal to the duration of the data symbols DS. A guard interval GI2 precedes the two training symbols T1 and T2. The short symbols t1 to t10 are used for signal detection, AGC, carrier frequency estimation (coarse frequency offset estimation) and FFT window positioning (timing synchronization). The two training symbols T1 and T2 are fixed, identical and BPSK (Binary Phase Shift Keying) modulated and are used to estimate the frequency response of the channel and to initialize the equalizer (channel estimation and fine frequency offset estimation). The training symbols T1 and T2 comprise pilot carriers which are referred to as training pilot carriers. The training pilot carriers have an amplitude and phase which is predetermined and well known to the receiver. A HiperLAN/2 compliant frame has a similar preamble of 16 µs.

The training symbols T1 and T2 are followed by the signal symbol SI which contains information for the receiver, and the data symbols DS which contain the data D1, D2, . . . , each of these symbols is preceded by a guard interval GI. Each data symbol DS comprises four pilot carriers PC (see FIG. 2) which can be used to update the equalizer and to correct for small synchronization errors.

Figure 2:
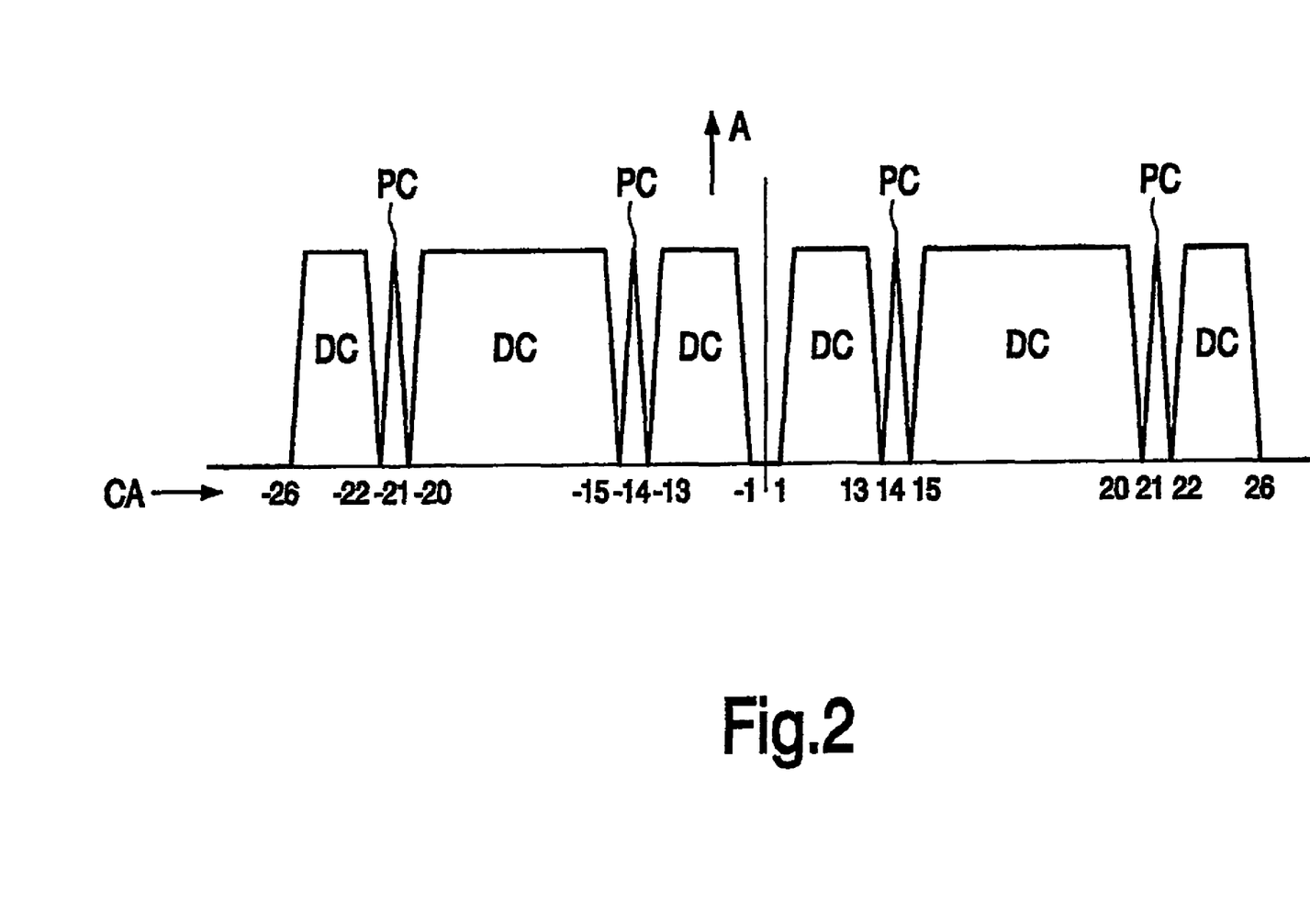
FIG. 2 shows a distribution of carriers of a data symbol.

FIG. 2 shows a distribution of carriers in data symbols. In both the IEEE802.11a and the HiperLAN/2 standard, the OFDM technique is used wherein 52 carriers CA (indexed from −26 to +26 excluding 0) are modulated with a carrier interval of 312.5 kHz. The 4 pilot carriers PC occur at the fixed carrier positions −21, −14, 14 and 21 and are BPSK modulated. The 48 data carriers DC occur at the carriers CA not occupied by the pilot carriers PC. The data carriers DC may be BPSK, QPSK, 16-QAM or 64-QAM modulated. The zero carrier is not modulated. In FIG. 2, the horizontal axis represents the frequency and the vertical axis represents the amplitude A of the carriers CA.

Figure 3:
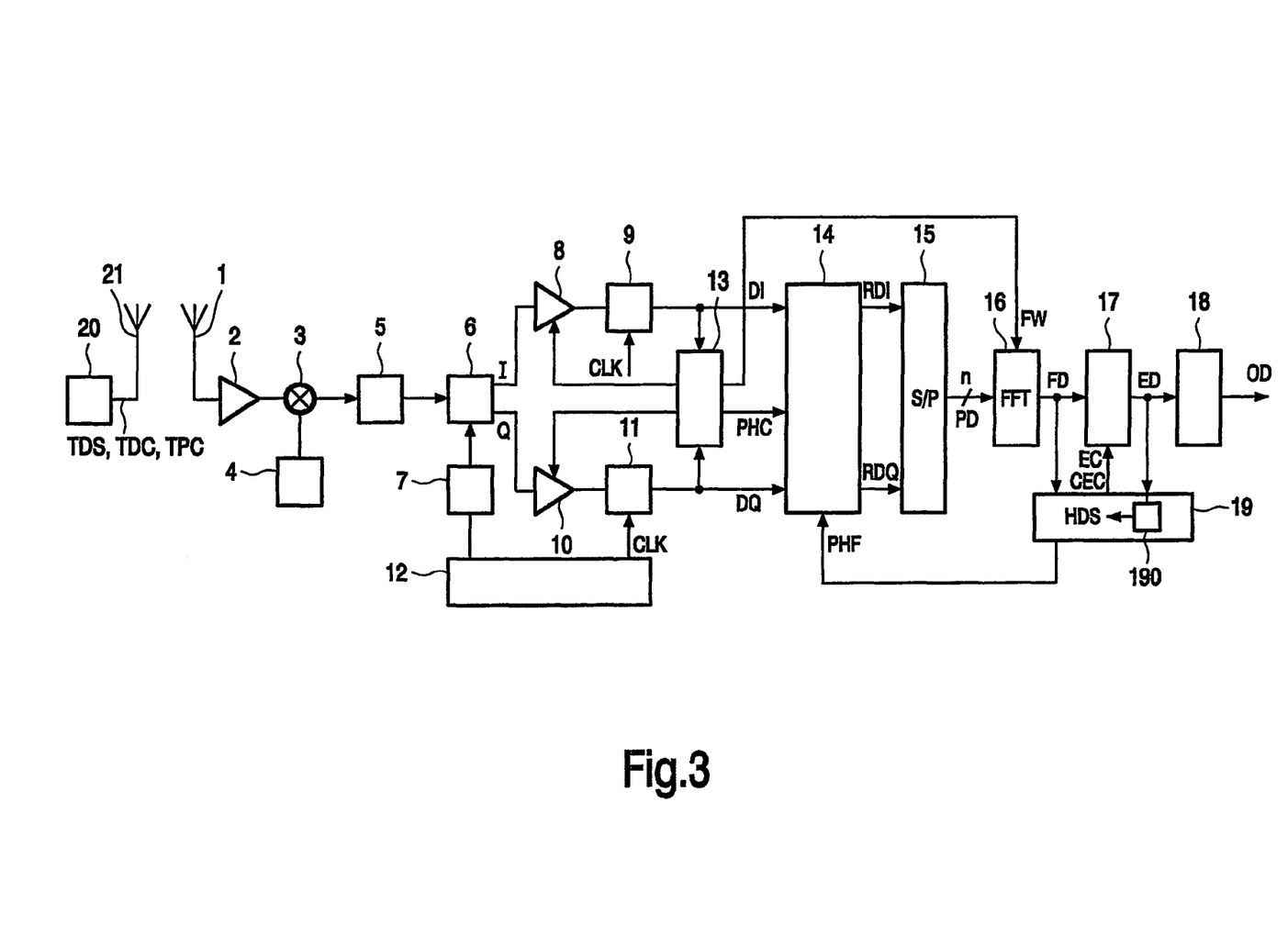
FIG. 3 shows a block diagram of a multi-carrier communication system.

FIG. 3 shows a block diagram of a multi-carrier communication system. Before discussing the circuits of FIG. 3 in detail, first the known problems of a multi-carrier transmission system are addressed.

Each symbol t1 to t10, T1, T2, SI, DS comprises a plurality of carriers CA which have a relatively small frequency offset with respect to each other. On each of the carriers CA complex data is modulated which is present during the duration of the symbol. For example, the data is modulated by using 64-QAM which provides 64 constellation points which are discrete data values obtained by discrete combinations of the I and Q components of the data. Usually, the plurality of carriers CA is modulated on a high frequent signal to be transmitted by air or cable.

Usually, a frame DF which is transmitted by air, will be heavily distorted when it reaches the receiver. The signal transmitted by the transmitter is distorted in the channel between the transmitter and the receiver. Especially in an indoor environment, usually echoes occur which causes the channel to fade frequency selective. Further, the transmitted signal will be deteriorated by noise added in the channel and in the receiver. The analogue front-end of the receiver introduces carrier and sampling clock frequency errors and gain errors. Consequently, different carriers CA at the different carrier frequencies suffer from different attenuations and different phase shifts. As an OFDM modulated signal uses a wide range of carrier frequencies, the receiver needs to estimate these distortions per carrier CA. The receiver uses the estimate per carrier CA to correct the carrier CA for these errors before the carrier CA is demodulated or demapped into bits. Usually this correction is implementation after the FFT and referred to as equalization in the frequency domain. For short frames DF, the channel characteristics may be considered to be constant, for long frames, the channel characteristics may change over time.

The transmitted signal which reaches the antenna 1 of the receiver after traveling through the channel may be strongly attenuated. The RF front-end (comprising 1 to 12) of the receiver down-converts the antenna signal to a baseband signal and provides an AGC function 8, 10 to optimally use the input range of the ADC's 9, 11. The RF front-end may add a considerable amount of noise. The AGC is controlled during the short training symbols t1 to t10. The value of the AGC will not be changed during the training symbols T1 and T2 and during the data symbols DS. Thus, the amplification factor of the front-end should be fixed during these last mentioned symbols. However, due to time constants in the AGC loop and switching effects, amplitude variations on all the carriers CA may occur which are common for all carriers CA and is referred to as common amplitude error CAE. The amplitude of the carriers CA may also be influenced by changing channel characteristics, for example due to an obstruction of the line of sight between the transmitter and the receiver.

The equalizer 17 in the receiver should take all these effects into account to obtain an optimal performance and to provide the best possible input to the demapper 18 which uses the phase and amplitude of the carrier received to be able to recover the bit value modulated on this carrier CA.

The short training symbols t1 to t10 are used to estimate the high frequent carrier frequency. This estimate may not be perfect and a residual carrier frequency error may remain. The carrier frequency error will be present on all carriers in the OFDM signal. After the FFT this is visible as a phase error on all OFDM symbols, and the phase error will increase or decrease (depending on the sign of the carrier frequency error) with each OFDM symbol. After the FFT, this phase jump is still the same and is present on all carriers CA and therefore referred to as the common phase error CPE. The absolute value of the common phase error CPE depends on the starting phase of the carrier frequency error. Thus, during demodulation, the common phase error CPE on the first OFDM symbol will have a predetermined value determined by the phase of the frequency error. Once the first common phase error CPE is known, the next common phase error CPE, which is a function of the frequency error, can be calculated. Assuming a frequency error of about one percent of the carrier spacing, the maximum common phase error CPE jump from symbol to symbol is about 0.0785 radians.

Timing errors in the sampling clock CLK of the ADC's 9, 11 also lead to phase errors on the carriers of an OFDM symbol. The timing errors cause phase errors which linearly increase or decrease with the carrier index and are therefore often referred to as differential phase errors DPE. A static timing error causes the FFT window to not exactly start at the start of the OFDM symbol and leads to a phase shift of the carrier CA that is proportional to its index. Thus, if the carrier indicated by the index 1 has no phase shift and the carrier indicated by the index 2 has a phase shift of k degrees, then the carrier indicated by the index 3 will have a phase shift of 2 k degrees. A clock frequency error causes a timing error which increases or decreases for each OFDM symbol. Thus, if in the first OFDM symbol the phase jump between two successive carriers CA is k degrees, then in the next OFDM symbol the phase jump between two successive carriers CA is smaller or larger than k degrees. Note that for IEEE802.11a and Hiper-LAN/2 the sampling clock CLK may be locked to the clock which generates the carrier frequency. In order to reduce the number of components in the receiver, it is possible to use a single crystal for both the clock frequency reference and the carrier frequency reference.

Now, the transmitter shown in FIG. 3 will be elucidated. The well known OFDM transmitter 20 is not elucidated in detail. The OFDM transmitter 20 provides burst of frames DF, for example as elucidated with respect to FIG. 1. In the embodiment in accordance with the invention shown in FIG. 3, the transmitter modulates the burst of frames DF on a high frequent carrier. The data symbols DS transmitted on this high frequent carrier are referred to as transmitted data symbols TDS which comprise transmitted data carriers TDC and transmitted pilot carriers TPC.

The OFDM receiver comprises an antenna 1 to receive the modulated high frequent carrier and a high-frequency amplifier 2 which amplifies the modulated high frequent carrier. A frequency converter 3, which usually is a mixer, receives both the high frequent signal supplied by the amplifier 2 and an oscillator signal from the local oscillator 4 to obtain an intermediate frequency signal which is supplied to the I/Q demodulator 6 via the band-pass filter 5. The I/Q demodulator 6 supplies the base band I and Q signals which represent the components of the complex data signal modulated on one of the data carriers DC of one of the data symbols DS. The VQ demodulator 6 receives an oscillator frequency from the fixed frequency oscillator 7. For example, the high frequent signal may be approximately 5 GHz, the local oscillator 4 may supply approximately 3.1 GHz such that an intermediate frequency of approximately 1.9 GHz results. The local oscillator 4 may be tunable to tune to the desired signal channel to be received. The fixed oscillator 7 supplies a frequency of approximately 1.9 GHz.

The signal I is supplied to the ADC 9 via the AGC circuit 8 to obtain a digital representation DI of the analog signal I. The signal Q is supplied to the ADC 11 via the AGC circuit 10 to obtain a digital representation DQ of the signal Q. A synchronization unit 13 receives the digital signals DI and DQ and uses the short symbols t1 to t10 to control the AGC circuits 8 and 10. The clock signals CLK for the ADC 9 and 11 and the fixed frequency oscillator 7 signal may originate from the same crystal oscillator 12.

The digital signals DI and DQ are supplied to a derotator 14 which supplies phase rotated signal RDI and RDQ. For example, the derotator 14 multiplies the complex signal I+jQ with a correction phase $\phi$, and thus supplies (I+jQ) j$\phi$. The phase rotation provided by the derotator 14 depends on a coarse phase correction signal PHC and may depend on a fine phase correction signal PHF. The coarse phase correction signal PHC is determined by the synchronization circuit 13 from the training symbols t1 to t10 and T1, 12. The generation of the fine phase correction signal PHF will be discussed later. The serial signals RDI and RDQ are converted into parallel signals PD by the serial to parallel converter 15. In fact, in the serial to parallel converter 15 sufficient samples are collected in time to be able to perform the FFT operation 16. The guard interval is stripped here as well. The start instant of the FFT is based on the short training symbols t1 to t10. In case of IEEE802.11a 64 out of 80 samples are used in the FFT. The FFT processor 16 further receives information FW on the FFT window position from the synchronization unit 13. The FFT-ed signal FD is supplied to the equalizer 17 to obtain equalized signals ED. The demapper 18 demaps the equalized signals ED into the output data bits OD.

The known channel estimator 19 receives the FFT-ed signal FD and evaluates the four training pilot carriers TRPC corresponding to the four data pilot carriers PC in the data symbols DS against the quality criterion to decide on which data pilots can be used to compensate for the common amplitude and/or the common phase errors. Only the amplitude and/or phase of these data pilot carriers PC is averaged to obtain the control signal CEC controlling the equalizer 17. To be able to distinguish the data symbols as obtained after the FFT operation 16, these data symbols are referred to as received data symbols DS which comprise received data carriers DC and received pilot carriers PC. In the receiver shown in FIG. 3, the detected phase errors are shown to be the fine phase correction signal PHF which are fed to the derotator 14. The amplitude errors are corrected in the equalizer 17. It is also possible to correct for the phase errors in the equalizer 17 as is elucidated with respect to FIG. 4.

The channel estimator 19 may comprises a slicer or hard-decision unit 190. The slicer 190 demaps the received carrier CA to the nearest constellation point. This means that the slicer 190, based on the input signal ED which is the FFT-ed signal, takes a hard decision on which constellation point is most probably transmitted. Thus, the channel estimator 19 also receives the input signal ED. The difference in phase and amplitude between the received carrier ED and the decided on carrier HDS which has the phase and amplitude of the constellation point decided on is used. The phase difference may be corrected in the derotator 14 or in the equalizer 17. The amplitude difference may be corrected in the equalizer 17.

Figure 4:
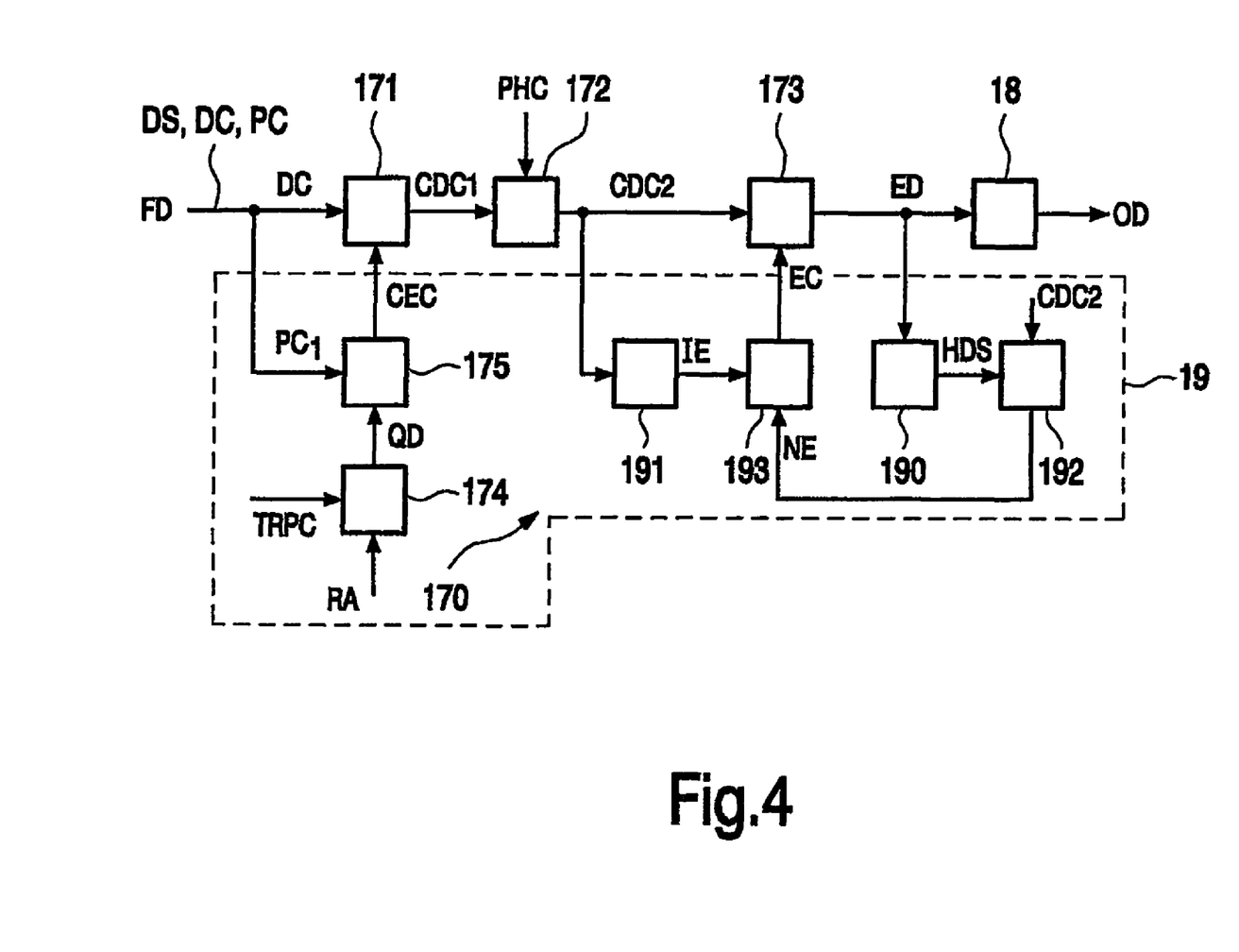
FIG. 4 shows a block diagram of the equalizer and the estimator in accordance with an embodiment of the invention.

FIG. 4 shows a block diagram of the equalizer 17 in accordance with an embodiment of the invention. The equalizer 17 as shown in FIG. 3 now comprises a CAE/CPE estimation unit 170 which receives the pilot carriers PC and supplies a control signal CEC to the CAE/CPE correction unit 171 which corrects the common phase error CPE and the common amplitude error CAE of the data carriers DC. The DPE correction unit 172 receives the corrected carriers CDC1 and a clock frequency error estimation. If in the transmitter a crystal is used to generate both the high frequency carrier and the clock CLK, the coarse frequency error estimate PHC from the synchronization unit 13 can be used to correct for the differential phase error DPE.

The CAE/CPE estimation unit 170 comprises a quality determination circuit 174 and a control unit 175.

The quality determination circuit 174 receives the training pilot carriers TRPC and a quality criterion RA to supply a quality determination signal QD to the control unit 175. The quality determination signal QD indicates which training pilot carriers TRPC of a training symbol T1 and/or T2 on the carrier frequencies of the four data pilot carriers PC occurring during the data symbols DS fulfils the quality criterion RA. For example, in a strongly frequency selective fading channel, the fading may occur at the frequency of one of the data pilot carriers PC and thus at the frequency of the corresponding one of the training pilot carriers TRPC. The amplitude of the training pilot carrier TRPC and thus of the corresponding data pilot carrier PC will be very low and is not representative for the common amplitude error and the common phase error in the channel at the data carriers DC of the data symbol to which the data pilot carrier PC belongs. Thus, a better estimation of these common errors CAE/CPE is obtained if the amplitude and the phase of this particular pilot carrier PC are not used. In a preferred embodiment, the quality determination circuit 174 compares the amplitude of the training pilot carriers TRCP corresponding to each one of the data pilot carriers PC with the predetermined value RA. The amplitude and/or phase of a particular data pilot carrier PC is only used if the amplitude of the corresponding training pilot carrier TRPC is larger than the predetermined value RA. The predetermined value RA may be different for different systems operating in different environments. The predetermined value RA may be determined by simulating the receiver by supplying several seeds at different values of RA, or experimentally in the field.

The control unit 175 receives the quality determination signal QD and the data pilot carriers PC and uses only the data pilot carriers PC which correspond to the training pilot carriers TRPC which fulfill the quality criterion to determine the control signal CEC which is supplied to the CAE/CPE correction circuit 171. In a preferred embodiment, the control unit 175 averages the amplitude of the data pilot carriers PC of a data symbol DS for the data pilot carriers PC which correspond to the training pilot carriers TRPC which fulfill the quality criterion. Then, the control unit 175 determines the difference between this averaged amplitude of the data pilot carriers PC of a data symbol DS and the average of the known predetermined amplitude of the data pilot carriers PC. The control signal CEC controls the CAE/CPE correction circuit 171 to correct for this difference between the averaged amplitude and the known predetermined amplitude. Thus, the control unit 175 averages the phase of the data pilot carriers RPC of a received data symbol DS for the data pilot carriers PC which correspond with training pilot carriers TRPC which fulfill the quality criterion. Then, the control unit 175 determines the difference between this averaged phase and the known predetermined phase of the data pilot carriers PC. The control signal CEC controls the CAE/CPE correction circuit 171 to correct for the difference between the averaged phase and the known predetermined phase. Usually, the correction circuit 171 supplies a control signal CEC which corrects both for the common amplitude error CAE and the common phase error CPE, but it might be possible to correct for only one of these common errors.

The channel corrector 173 receives the corrected carriers CDC2 from the DPE correction circuit 172 and supplies the input signal ED to the channel estimator 19 which comprises the slicer 190. The channel estimator 19 determines the control signal EC which controls the channel corrector 173. Usually, the channel estimator 19 only uses the corrected carriers CDC2 of the training symbols T1 and T2 to determine the control signal EC such that the phase and amplitude distortions caused by the channel are substantially compensated for during the complete frame DF. However, if the channel characteristics change during the frame DF, this correction will not be optimal. It is known to use the four pilot carriers PC to correct for changing channel characteristics. But the use of the four pilot carriers PC is not sufficient to provide channel tracking for a complete carrier coefficient set.

In a channel with frequency selective fading, different carriers CA will suffer from different attenuations and different phase shifts. The receiver needs to make an estimate of these distortions per carrier CA, and to correct for them before they can be demapped to bits. The channel estimator 19 comprises the well known original channel estimator 191 which uses the two training symbols T1 and T2 to estimate the phase and amplitude distortion of each of the carriers CA. This estimation is referred to as the initial estimate IE. Note that the original channel estimator 191 will not be fully accurate due to additive noise. For short frames, the channel characteristics can be assumed to be static, but for long frames, the channel characteristics may change over time. The equalizer 17 in accordance with an embodiment of the invention uses the equalized carriers ED and CDC2 to update the channel estimate EC during the data symbols DS. This update assures that the channel estimate stays correct, even if the channel conditions change during the reception of the frame DF. The channel update also improves the initial channel estimate IE based on the training symbols T1 and T2 if it was noisy.

The channel estimator 19 stores the phase distortion and the amplitude distortion as determined during the training symbols T1 and T2 for each data carrier DC. The data carriers DC are provided to the channel correction unit 173 one by one, and the phase error and the amplitude error are removed by using the channel estimate EC for the data carriers DC one by one. After the channel correction unit 173, each data carrier DC should have the correct amplitude and phase, and is only distorted by additive noise. The output of the channel correction unit 173 is coupled to the demapper 18 and the input of the channel correction circuit 173 is coupled to the slicer 190.

The slicer 190 demaps the carrier of each data symbol DS to the nearest constellation point HDS (i.e. the slicer 190 takes a hard decision). It is also possible to use the slicer of the demapper 18, if present. This hard decision HDS, which is interpreted as the transmitted carrier, is compared to the received carrier CDC2 (before the channel correction) in the comparator unit 192. The amplitude difference and the phase difference between the received carrier CDC2 and the decided transmitted carrier HDS is used as the new channel estimate NE. Usually, due to the distortions caused by the channel, the received carrier constellation point will usually not coincident with one of 64 constellation points which are modulated on the carrier in the transmitter. Thus, with the term received carrier constellation point is meant the amplitude and phase of this carrier as received.

This new channel estimate NE may be directly used for the same carrier CA of the next data symbol DS by controlling the channel correction unit 173 such that the received constellation point is corrected to become substantially equal to the hard decided constellation point. Thus, after this correction, at the input of the channel correction circuit 173, the amplitude and phase of the carrier CA substantially equals the amplitude and phase of the constellation point which was decided on by the slicer 190.

However, it is better to not directly use the new channel estimate NE as the control signal EC of the channel correction unit 173, but to add a filter 193 which generates an updated channel estimate EC as a combination of the initial channel estimate IE and the new channel estimate NE. For example, the update channel estimate EC may be:

$$EC = \alpha NE - (1-\alpha) IE$$

wherein NE is the new channel estimate, and IE is the initial channel estimate. The initial channel estimate IE is the channel estimate made by the channel estimator 191 based on the training symbols T1 and T2. The optimal value of a depends on the signal to noise ratio in the channel. It is also possible to use another averaging algorithm or low pass filtering on one or more initial channel estimate(s) IE and the new channel estimate NE.

The use of the difference between the corrected signal (the received carrier constellation point) CDC2 and the output signal (the determined carrier constellation point) HDS of the slicer 190 to control the channel corrector 173 to substantially correct the amplitude and phase of this carrier CA such that the received carrier constellation point becomes more equal to the determined carrier constellation point does not require any changes to the well known slicer 190 and channel corrector 173. It is only required to add a new channel estimate circuit 192 which determines the difference between the received carrier constellation point and the determined constellation point to control the channel corrector 173 with or also with this difference. Preferably, the channel estimator 19 further comprises an averaging circuit 193 which averages the initial channel estimate IE with the new channel estimate NE.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A receiver for a multi-carrier communication system, the receiver being arranged for receiving training pilot carriers (TRPC) during a training symbol (T1, T2) preceding data symbols (DS) comprising data carriers (DC) and data pilot carriers (PC), the receiver comprising:

a correction unit (171) for supplying, under control of a control signal (CEC), a corrected signal (CDC1) comprising information on the data carriers (DC) being corrected for a common amplitude error and/or common phase error, a quality determination unit (174) for determining which ones of the training pilot carriers (TRPC) occurring at positions of the data pilot carriers (PC) fulfill a predetermined quality criterion, and a control unit (175) for supplying the control signal (CEC) being dependent on an amplitude and/or phase of the data pilot carriers (PC) of which corresponding training pilot carriers (TRPC) fulfill the predetermined quality criterion, and not on the data pilot carriers (PC) of which corresponding training pilot carriers (TRPC) do not fulfill the predetermined quality criterion, wherein the control unit (175) is arranged for averaging the amplitude and/or phase of the data pilot carriers (PC) of which the corresponding training pilot carriers (TRPC) fulfill the predetermined quality criterion to provide an estimate for the common amplitude error and/or common phase error.

2. A receiver for a multi-carrier communication system as claimed in claim 1, wherein the control unit (175) is arranged for performing said averaging for each data symbol (DS).

3. A receiver for a multi-carrier communication system as claimed in claim 1, wherein the receiver further comprises a Fast Fourier Transform circuit (16) for supplying the data symbol (DS), the corrected signal (CDC1) representing a phase and amplitude of the data carriers (DC).

4. A receiver for a multi-carrier communication system as claimed in claim 1, wherein the quality determination unit (174) is arranged for comparing an amplitude of each of the training pilot carriers (TRPC) with a reference amplitude (RA), a particular one of the training pilot carriers (TRPC) fulfilling the predetermined quality criterion only if its amplitude is higher than the reference amplitude (RA).

5. A receiver for a multi-carrier communication system as claimed in claim 1, wherein the quality determination unit (174) is arranged for comparing a phase of each of the training pilot carriers (TRPC) with an average value of phase of the training pilot carriers (TRPC), a particular one of the training pilot carriers (TRPC) fulfilling the predetermined quality criterion only if its phase difference with respect to the average value is smaller than a predetermined value.

6. A receiver for a multi-carrier communication system as claimed in claim 1, wherein the multi-carrier communication system is based on orthogonal frequency division multiplexing.

7. A multi-carrier communication system comprising a receiver as claimed in claim 6.

8. A wireless multi-carrier communication system comprising a receiver as claimed in claim 1, wherein said system comprises a transmitter for transmitting a modulated multi-carrier high frequent signal via air, and the receiver comprises means for receiving said high frequent signal.

9. A receiver for a multi-carrier communication system as claimed in claim 1, wherein a data pilot carrier and the corresponding training pilot carrier of the data pilot carrier have the same carrier frequency.

10. A receiver for a multi-carrier communication system as claimed in claim 1, wherein the corrected signal (CDC1) comprises the information on the data carriers (DC) being corrected for the common amplitude error, wherein the control unit (175) for supplying the control signal (CEC) being dependent on the amplitude of the data pilot carriers (PC) of which corresponding training pilot carriers (TRPC) fulfill the predetermined quality criterion, and not on the data pilot carriers (PC) of which corresponding training pilot carriers (TRPC) do not fulfill the predetermined quality criterion, and wherein the control unit (175) is arranged for averaging the amplitude of the data pilot carriers (PC) of which the corresponding training pilot carriers (TRPC) fulfill the predetermined quality criterion to provide an estimate for the common amplitude error.

11. A receiver for a multi-carrier communication system as claimed in claim 1, wherein the corrected signal (CDC1) comprises the information on the data carriers (DC) being corrected for the common phase error, wherein the control unit (175) for supplying the control signal (CEC) being dependent on the phase of the data pilot carriers (PC) of which corresponding training pilot carriers (TRPC) fulfill the predetermined quality criterion, and not on the data pilot carriers (PC) of which corresponding training pilot carriers (TRPC) do not fulfill the predetermined quality criterion, and wherein the control unit (175) is arranged for averaging the phase of the data pilot carriers (PC) of which the corresponding training pilot carriers (TRPC) fulfill the predetermined quality criterion to provide an estimate for the common phase error.

12. A receiver for a multi-carrier communication system as claimed in claim 1, wherein the corrected signal (CDC1) comprises the information on the data carriers (DC) being corrected for the common amplitude error and the common phase error, wherein the control unit (175) for supplying the control signal (CEC) being dependent on the amplitude and the phase of the data pilot carriers (PC) of which corresponding training pilot carriers (TRPC) fulfill the predetermined quality criterion, and not on the data pilot carriers (PC) of which corresponding training pilot carriers (TRPC) do not fulfill the predetermined quality criterion, and wherein the control unit (175) is arranged for averaging the amplitude and phase of the data pilot carriers (PC) of which the corresponding training pilot carriers (TRPC) fulfill the predetermined quality criterion to provide an estimate for the common amplitude error and the common phase error.

13. A method of receiving a multi-carrier carrier modulated signal in a multi-carrier communication system, the method comprising:

receiving (1) training pilot carriers (TRPC) during a training symbol (T1, T2) preceding data symbols (DS) comprising data carriers (DC) and data pilot carriers (PC), supplying (171), under control of a control signal (CEC), a corrected signal (CDC1) comprising information on the data carriers (DC) being corrected for a common amplitude error and/or common phase error, determining (174) which ones of the training pilot carriers (TRPC) occurring at positions of the data pilot carriers (PC) fulfill a predetermined quality criterion, supplying (175) the control signal (CEC) being dependent on an amplitude and/or phase of the data pilot carriers (PC) of which corresponding training pilot carriers (TRPC) fulfill the predetermined quality criterion, and not on the data pilot carriers (PC) of which corresponding training pilot carriers (TRPC) do not fulfill the predetermined quality criterion, and averaging the amplitude and/or phase of the data pilot carriers (PC) of which the corresponding training pilot carriers (TRPC) fulfill the predetermined quality criterion to provide an estimate for the common amplitude error and/or common phase error.

14. A receiver for a multi-carrier communication system, the receiver being arranged for receiving training pilot carriers (TRPC) during a training symbol (T1, T2) preceding data symbols (DS) comprising data carriers (DC) and data pilot carriers (PC), the receiver comprising:
- a correction unit (171) for supplying, under control of a control signal (CEC), a corrected signal (CDC1) comprising information on the data carriers (DC) being corrected for a common amplitude error,
- a quality determination unit (174) for determining which ones of the training pilot carriers (TRPC) occurring at positions of the data pilot carriers (PC) fulfill a predetermined quality criterion, and
- a control unit (175) for supplying the control signal (CEC) being dependent on an amplitude and/or phase of the data pilot carriers (PC) of which corresponding training pilot carriers (TRPC) fulfill the predetermined quality criterion, and not on the data pilot carriers (PC) of which corresponding training pilot carriers (TRPC) do not fulfill the predetermined quality criterion.

15. A receiver for a multi-carrier communication system as claimed in claim 14, wherein a data pilot carrier and the corresponding training pilot carrier of the data pilot carrier have the same carrier frequency.

16. A receiver for a multi-carrier communication system as claimed in claim 14, wherein the quality determination unit (174) is arranged for comparing an amplitude of each of the training pilot carriers (TRPC) with a reference amplitude (RA), a particular one of the training pilot carriers (TRPC) fulfilling the predetermined quality criterion only if its amplitude is higher than the reference amplitude (RA).

17. A receiver for a multi-carrier communication system as claimed in claim 14, wherein the control unit (175) is arranged for averaging the amplitude of the data pilot carriers (PC) of which the corresponding training pilot carriers (TRPC) fulfill the predetermined quality criterion to provide an estimate for the common amplitude error.

* * * * *